United States Patent [19]

Sweeney et al.

[11] Patent Number: 4,770,482
[45] Date of Patent: Sep. 13, 1988

[54] SCANNING SYSTEM FOR OPTICAL TRANSMITTER BEAMS

[75] Inventors: Harold E. Sweeney, Menlo Park; Donald A. Leonard, Cupertino, both of Calif.

[73] Assignee: GTE Government Systems Corporation, Stamford, Conn.

[21] Appl. No.: 886,464

[22] Filed: Jul. 17, 1988

[51] Int. Cl.[4] .......................... G02B 6/00; F41G 7/00
[52] U.S. Cl. ................................ 350/96.10; 850/6.4; 850/96.15; 850/96.24; 244/3.16
[58] Field of Search ............... 350/96.10, 96.24, 96.15, 350/96.18, 96.20, 96.19, 96.29, 96.30, 6.4; 250/227, 203 R; 244/3.16; 356/3, 17

[56] References Cited

U.S. PATENT DOCUMENTS

| | | | |
|---|---|---|---|
| 3,378,687 | 4/1968 | Schepler | 350/6.4 X |
| 3,590,248 | 6/1971 | Chatterton, Jr. | 350/96.24 X |
| 3,782,667 | 1/1974 | Miller, Jr. et al. | 244/3.16 X |
| 3,803,597 | 4/1974 | Kirner | 350/96.24 X |
| 4,054,364 | 10/1977 | Webster | 350/96.24 X |
| 4,209,224 | 6/1980 | Stewart, Jr. | 350/6.4 |
| 4,556,284 | 12/1985 | Albersdoerfer et al. | 350/96.24 X |

FOREIGN PATENT DOCUMENTS

| | | | |
|---|---|---|---|
| 3217785 | 12/1983 | Fed. Rep. of Germany | 350/6.4 X |
| 1455119 | 11/1976 | United Kingdom | 244/3.16 |
| 2039381 | 8/1980 | United Kingdom | 350/96.24 X |

OTHER PUBLICATIONS

"Scanning Ring Illumination for Laser Processing" IBM Tech. Discl. Bull., vol. 29, No. 10, 3/87 p. 4697.
Applied Optics asnd Optical Engineering, vol. III, "Optical Components,'8 1965, p. 307, published by Academic Press, Inc., New York, NY.

Primary Examiner—William L. Sikes
Assistant Examiner—Brian M. Healy
Attorney, Agent, or Firm—Douglas M. Gilbert; John F. Lawler

[57] ABSTRACT

A system for rapidly scanning a remote field of regard with transmitter laser beams comprises an optical system having a focal plane, a plurality of lasers capable of being sequentially fired, and a like number of optical fibers coupled at one end to the respective laser outputs. The opposite fiber ends lie in the focal plane of the optical system and are aligned in the direction of the height of the field of regard. The beams move rapidly across the width of the field of regard simultaneously with sequential operation of the lasers, thus illuminating the entire area of interest in a minimum of time.

6 Claims, 2 Drawing Sheets

SCANNING SYSTEM FOR OPTICAL TRANSMITTER BEAMS

BACKGROUND OF THE INVENTION

This invention was made with Government support under Contract No. N00024-85-C-5301 awarded by the Department of the Navy. The Government has certain rights in this invention.

1. Field of the Invention

The present invention relates to an improved system for scanning optical transmitter beams over a remote field of regard in a minimum of time.

2. Description of the Prior Art

In optical ranging, tracking and communication systems operating in space or in an atmospheric environment, there is always a need for acquisition of a target. For example, in a laser radar system the operator must first acquire or "find" the target by search-scanning a laser transmitter beam over a selected area, called a field of regard, and thereafter lock onto the target if present in that field. The acquisition process thus requires that a narrow laser beam be scanned over the solid angle corresponding to the field of regard and advantageously in a minimum of time.

In the past, acquisition has been achieved with mechanically actuated mirrors or other optical elements. The speed of acquisition, however, is limited by the requirement of moving the mass of the particular element and to reposition it accurately. Another technique involves the use of acousto-optical devices, such as a bragg cell, for steering the optical beam but these have limited application because of potential damage to the materials at peak transmitter powers.

This invention is directed to a system that avoids the above disadvantages.

OBJECTS AND SUMMARY OF THE INVENTION

A general object of the invention is the provision of scanning system for optical transmitter beams capable of illuminating a field of regard in a minimum of time.

This and other objects of the invention are achieved with an scanning system comprising a plurality of transmitter lasers with output ports coupled by optical fibers to the focal plane of a beam focussing lens. This lens focusses the laser output beams on a remote field of regard in positions corresponding to those of the fiber ends in the focal plane. Means are provided to fire the lasers sequentially and thus to so illuminate the field of regard in one direction and additional means are provided to move the beams transversely of the one direction for sweeping the illumination path over entire field of regard.

BRIEF DESCRIPTION OF THE DRAWINGS

For a better understanding of the invention as well as other objects and further features thereof, reference is made to the following description which is to be read in conjunction with the accompanying drawings wherein.

DESCRIPTION OF PREFERRED EMBODIMENTS

Figure 1:
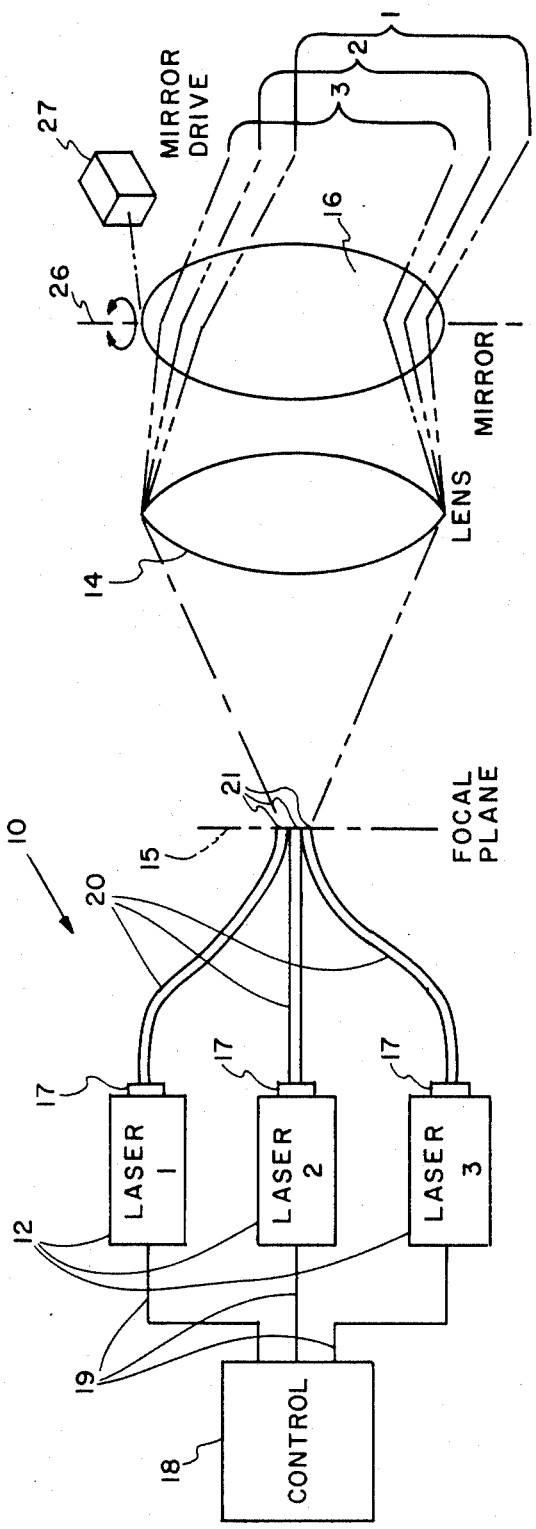
FIG. 1 is a schematic representation of an optical scanning system embodying the invention.

Referring now to the drawings, FIG. 1 shows an embodiment of the invention comprising an optical scanning system 10 having a plurality of substantially identical preferably pulsed lasers 12, three as shown by way of example, a lens 14 having a focal plane 15 between the lens and lasers 12, and a mirror 16 adjacent to lens 14 on the side thereof opposite focal plane 15. While the number of lasers 12 vary with the requirements of the application, three pulsed lasers are shown by way of example and, are designated as laser 1, laser 2 and laser 3 in the drawing. Lasers 12 have output ports 17, respectively, and are operated or "fired" sequentially by a control 18 connected by lines 19 to the lasers.

Laser output ports 17 are connected to a like number of optical fibers 20, respectively, having opposite ends 21 disposed contiguously in focal plane 15 of lens 14 and aligned in one direction, vertical as shown in the drawing. With this arrangement, the output beams B1, B2 and B3 of the three lasers 12, respectively, are focussed by lens 14 and reflected by mirror 16 on a remote field of regard 23, see FIG. 3.

Mirror 16 is supported for rotation about an axis 26 which is parallel to the direction of alignment of fiber ends 21 in focal plane 15. A mirror drive mechanism 27 is operatively connected to mirror 16 to reciprocably rotate it through a predetermined angle which defines the width W of the field of regard, see FIG. 3. Thus mirror 16 when driven by mechanism 27 sweeps the pulsed laser beams B1, B2 and B3 transversely of the alignment direction of fiber ends 21 in focal plane 15 and the sequentially fired lasers thus illuminate the entire area of the field of regard 23. The number N of lasers is selected so that the spot size diameters D of the respective contiguous beams at the field of regard extend fully across the height H of that field. Stated differently, the number N of laser is defined by the relationship $$N = H/D.$$

Control 18 functions to fire lasers 12 in a predetermined sequence and may, for example, comprise a shift register 30 (preset to a 100 code) operated by a clock 31 to transmit trigger signals sequentially on lines 19 to lasers 12. Shift register 30 normally is operated to continuously repeat this firing sequence.

Figure 3:
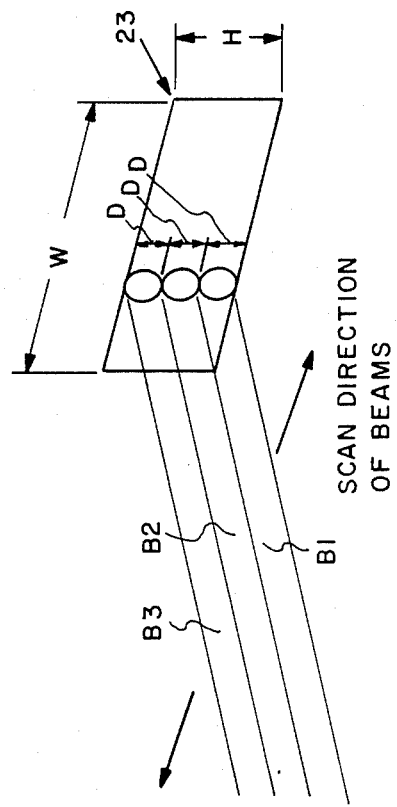
FIG. 3 is a schematic diagram showing the relative positions of the laser output beams and the field of regard.

In operation, scanning system 10 is employed to search a relatively small area, i.e., field of regard 23 in FIG. 3, as part of a much larger search area. For example, a large search sector having limits of 10 degrees in width and 5° in height may be searched by a radio frequency radar system to locate a target therewithin. If such target is found, however, the precision of its position coordinates within the search sector is limited by the carrier wavelength of the transmitted beam. Since such precision is much higher with search beams at optical wavelengths as compared to beams at RF wavelengths, the optical scanning system is used to search a smaller search sector within the large sector, the former typically being in the order of 4° in width by 0.5° in height.

The plurality of lasers 12 are sequentially fired by control 18 and optical fibers 20 transmit the laser outputs to the focal plane 15 of lens 14; fiber ends 21 are contiguous and are aligned in a direction corresponding to the the height H of field of regard 23. The laser outputs are formed into beams B by lens 14 and are reflected by mirror 16 to the remote field of regard 23 which is illuminated over a narrow column of height H almost instantaneously by the sequentially fired lasers. Mirror 16 is rotated by drive mechanism 27 about axis 26 which, being parallel to the alignment direction of fiber ends 21, causes beams to B1, B2 and B3 to sweep or scan across the width W of field of regard 23. The scan time for a field of regard width W of 4 degrees typically is about 0.3 seconds. Thus the entire area of field of regard 23 is rapidly illuminated by the several laser beams.

Figure 4:
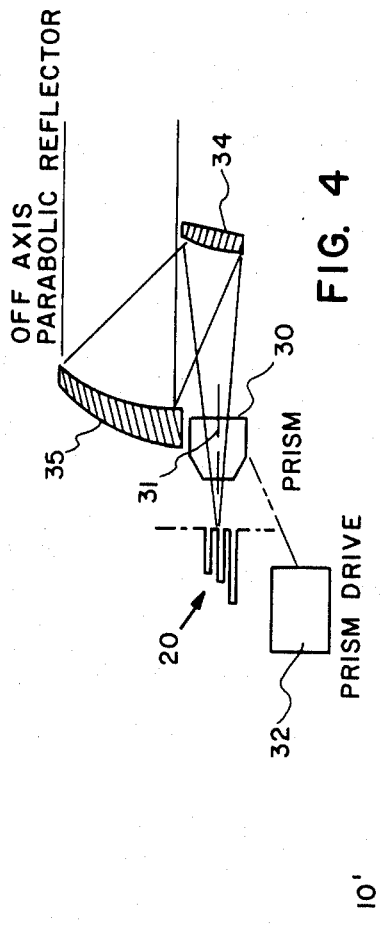
FIG. 4 is a schematic view of part of a scanning system embodying an another form of the invention.

Another embodiment of the invention is shown in FIG. 4 in which a plurality of lasers, not shown, are arranged as shown in FIG. 1 with optical fibers 20 connected to the outputs of the lasers, respectively, and having their ends 21 aligned in the focal plane 15 of an off-axis Cassegrainian telescope 35, 34. In FIG. 4, the off-axis Cassegrainian telescope performs the same functions as lens 14 and the Pechan prism provides the capability of rotating the plurality of incident beams B when rotated. A more complete description of the Pechan prism is given in *APPLIED OPTICS AND OPTICAL ENGINEERING*, Vol. III, "Optical Components," 1965, page 307, published by Academic Press, Inc., New York, N.Y.

Figure 2:
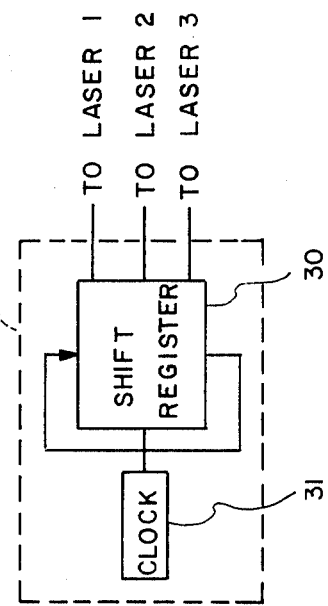
FIG. 2 is a block diagram showing details of the laser firing control.

Prism 30 has an axis 31 of rotation aligned with the direction of propagation of laser outputs from fibers 20 and is rotated about axis 31 by a prism drive mechanism 32. In the embodiment shown, prism 30 directs the laser outputs from fibers 20 onto the secondary mirror 34 and thence to the primary mirror 35. In operation, as prism 30 is rotated about axis 31, the plurality of sequentially fired laser output beams from fibers 20 are likewise rotated about axis 31. The rotating beams are directed by mirror 34 and reflector 35 to the remote field of regard which is illuminated the circularly scanning beams. In this manner, a larger area of the field of regard is illuminated by the beams in a minimum of time. The rotating laser beams are swept across the width W of the field of regard by a rotatable mirror as described above in conjunction with FIG. 2.

Figure 5:
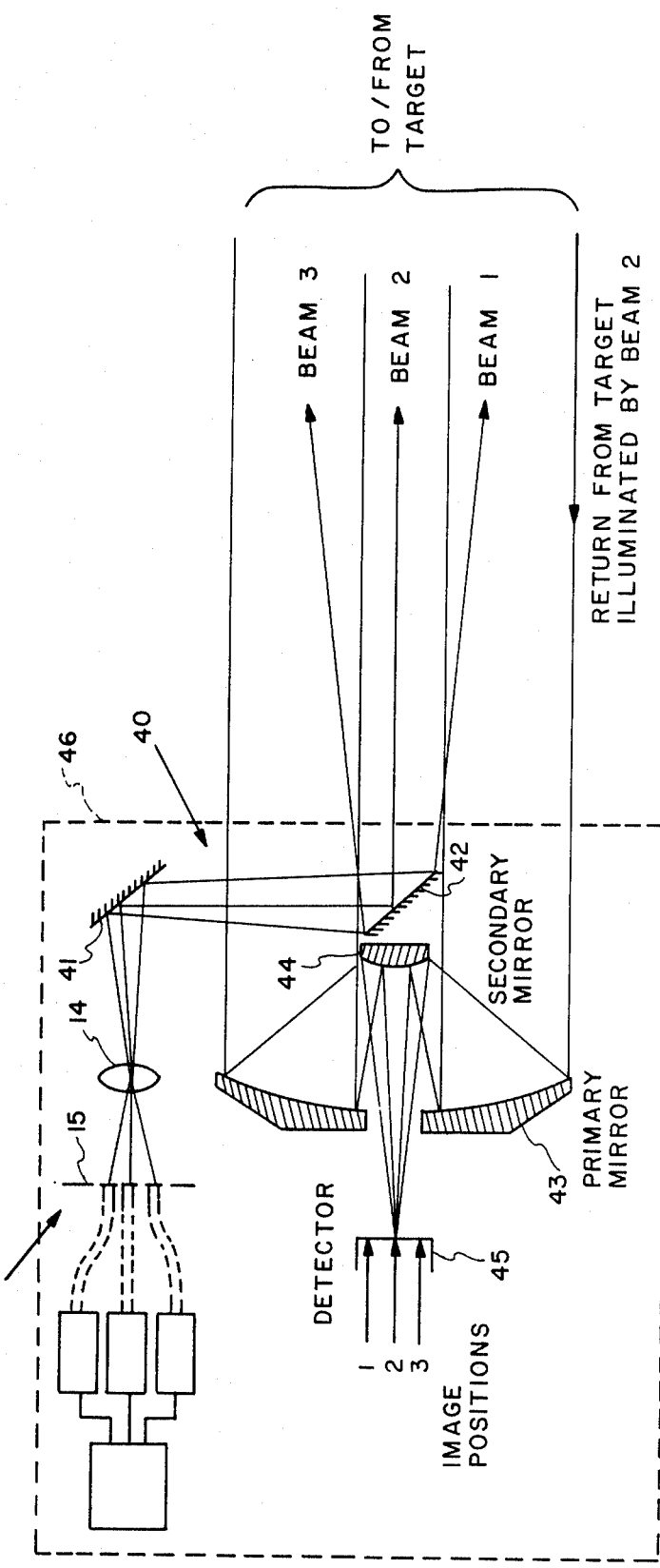
FIG. 5 is a schematic representation showing the scanning system of this invention in an optical radar embodiment.

Another embodiment of the invention is shown in FIG. 5, in laser radar apparatus 40 having a multiple laser scanning system 10' similar to system 10 described above except without rotatable mirror 16, like reference characters indicating like parts on the drawings. The laser beams are directed from lens 14 by mirrors 41 and 42 to the remote target, not shown, and signals reflected by the target are focused by primary and secondary receiving mirrors 43 and 44, respectively, on detector 45. In this embodiment, apparatus 40 is mounted on a platform indicated by the broken line rectangle 46 which is movable relative to the target by suitable means such as rocket motors or the like to provide scanning movements of the laser beams across the width W of the remote field of regard.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An optical scanning system for scanning a remote field of regard comprising:
    a plurality of lasers having output ports, respectively;
    a like number of optical fibers connected to said output ports, respectively, for transmitting laser outputs;
    means to fire said lasers separately and in a predetermined sequence with each laser being fired at least once in a time interval $T_1$, whereby correspondingly to produce a plurality of outputs at said ports;
    an optical system having a focal plane;
    said fibers having respective ends remote from said laser output ports disposed in said focal plane and aligned in a first direction for transmitting said laser outputs to said focal plane whereby said optical system forms said laser outputs into beams, respectively; and
    means for scanning said beams in a second direction transversely of said first direction across said field of regard in a time interval $T_2$ where, $T_2 >> T_1$.

2. The system according to claim 1 in which said last named means comprises mirror means adjacent to said optical system and disposed to reflect said beams, and
    means to move said mirror means whereby to translate the reflected beams in said second direction.

3. The system according to claim 1 in which said optical system includes a Pechan prism, and means to rotate said prism about the axis of propagation of said beams therethrough.

4. The system according to claim 1 in which said last named means comprises a platform on which said lasers, fibers, optical system and firing means are mounted, said platform being movable in said second direction.

5. A system for optically illuminating a remote field of regard having a predetermined area with laser means having an output beam with an area at the field of regard substantially less than said predetermined area, comprising:
    a plurality of lasers having output ports, respectively;
    a like number of optical fibers having one set of adjacent ends connected to said output ports, respectively, and having the opposite ends thereof aligned in a first direction in a common plane whereby to transmit output beams from said lasers to said plane;
    an optical system between said field of regard and said ends of said fibers, said optical system having a focal plane coincident with said common plane whereby to focus the laser output beams emanating from said ends of the fibers, respectively, in said first direction on said field of regard;
    means to operate said lasers sequentially with each laser being fired at least once in a time interval $T_1$, whereby to so illuminate a portion of said field of regard with the output beams, respectively, of said lasers; and
    means to move said beams in a second direction transversely of said first direction to illuminate the entire area of said field of regard over a time interval $T_2$ where, $T_2 >> T_1$.

6. The system according to claim 5 in which said field of regard has a predetermined width W in said first direction, each of said laser beams having a spot size diameter D at said field of regard, the number N of said plurality of lasers being determined by the relationship $N = W/D.$

* * * * *